United States Patent Office 3,518,003
Patented June 30, 1970

3,518,003
PROCEDURE FOR CONTINUOUS REGISTRATION OF THE CONCENTRATION OF FIBRE SUSPENSIONS
Fredrik W. Meyn, Bygdoy Terasse 22, Oslo, Norway
Filed July 22, 1966, Ser. No. 567,113
Claims priority, application Norway, July 23, 1965, 159,075
Int. Cl. G01n 21/44, 11/00; D21c 7/12
U.S. Cl. 356—116                                    4 Claims

ABSTRACT OF THE DISCLOSURE

A method for the continuous measurement in the pulp and paper production of the concentration of fibre suspensions in the region 0%–3% includes the steps of directing a plane polarized light in a known way through the suspension and thereafter passing the transmitted light through a polarization filter device, the direction of which is rotated and preferably is at right angles to the direction of polarization of the incident light, and measuring the light intensity.

---

Figure 1:
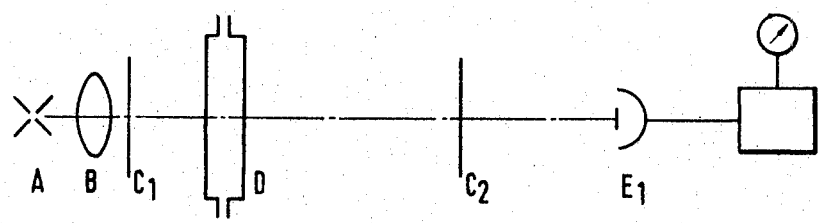

This present invention relates to a procedure for continuous registration of the concentration of fibre suspensions.

During pulp and paper production it will be of great advantage to know the concentration of fibre suspensions. The fibre concentration will usually vary from 10% for the stock consistency, and down to a few tenths of a percent in the headbox of the paper machine, and perhaps a few hundreds of a percent in the effluent from the paper mill.

For higher consistencies, i.e. above ca. 3%, methods based on measurement of the viscosity of the suspension are mainly used. The viscosity in this region is strongly dependent on the concentration of the fibre suspension, and if the other variables are under control, reliable results may be obtained. At consistencies lower than 3%, these methods cannot be used, and it has been very difficult to find a method for continuous registration of the fibre concentration. Many attempts have, however, been made and most of the trials have been based on optical properties. The attempts have mainly been based on measurement of absorption or dispersion of light falling on the fibre. These attempts have, however, not been successful. This is mainly due to the fact that other materials than paper fibres are able to disperse or absorb light, for instance mineral fillers added to the pulp, or air dispersed in the aqueous system.

The present invention is based on the fact that cellulose or groundwood fibres are optically active, and thus rotate the plane of polarization for polarized light. According to the invention polarized light is passed through a fibre suspension. The transmitted light is then directed towards a polarizing device whose direction of polarization is at right angles to the direction of polarization of the incident light. Light whose direction of polarization has been changed by the fibres will be able to pass this filter and falls on a light sensitive device for registration of the light intensity.

The use of polarized light to visualize optically active matters is known. Sugar polarimeters are used for measurement of the concentration of sugar solutions. Microscopes may also be equipped with polarization filters for visualizing of optically active preparates. In the German patent, No. 1,163,577 IR. (Edward Alfred Kohlendorf) an apparatus for counting the number of undissolved cellulosic particles in viscouse based on this principle is described. Viscose flowing in a capillary tube is illuminated with polarized light. The transmitted light is thereafter directed towards a polarization filter with the direction of polarization rotated to a right angle to the polarized light, and a photo cell senses the number of undissolved cellulosic particles passing.

The use of polarized light has, however, to our knowledge never been proposed for measurement of the concentration of fibre suspensions in pulp and paper production, in spite of the great efforts which have been made in order to find a useful solution based on optical principles.

In FIG. 1 is shown how this principle may be used in the pulp and paper production for measurement of fibre concentration. Light from source A is passing the optical system B, the polarization filter $C_1$, the cell $d$, but cannot pass the second polarization filter $C_2$ when no fibre suspension is present in the cell. When a fibre suspension is flowing through the cell, the plane of polarization is rotated by the fibres and part of the light can pass the second filter and fall on the photo cell $E_1$. An electric signal is thus generated, proportional or nearly proportional to the fibre concentration in the cell. This signal can be recorded by a suitable instrument.

In order to compensate for absorption and dispersion of light in the fibre suspension owing to dispersed air, added fillers, etc., the light which has passed the fibre suspension may be divided into two light beams by the aid of a suitable device. One of the beams is, as already described, directed towards the polarization filter and the light sensitive device, whereas the other beam is directed towards another light sensitive device. An electric signal will thus be generated from each of the light sensitive devices, where the one is depending on the fibre concentration in the suspension but is influenced by dispersion and absorption in the suspension, whereas the other signal will only depend on absorption and dispersion in the suspension. By combining the two electric signals in a suitable manner, it is possible to compensate, or partly compensate, for absorption and dispersion of light in the fibre suspension.

Figure 2:
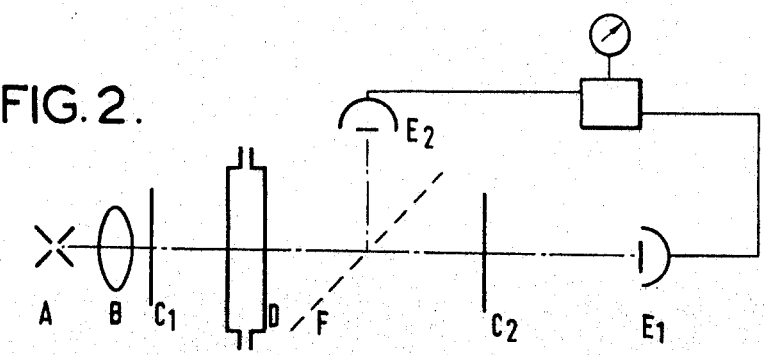

An example of an apparatus based on these principles is shown in FIG. 2. Transmitted light from the cell D is divided into two beams by means of a semi-transparent mirror F. One of the beams is, as in Example 1, directed towards the second polarization filter $C_2$ and the photo cell $E_1$, whereas the second beam is falling on the photo cell $E_2$. The two photo cells are connected in a bridge and the unbalance of the bridge is a measure of the fibre concentration.

Figure 3:
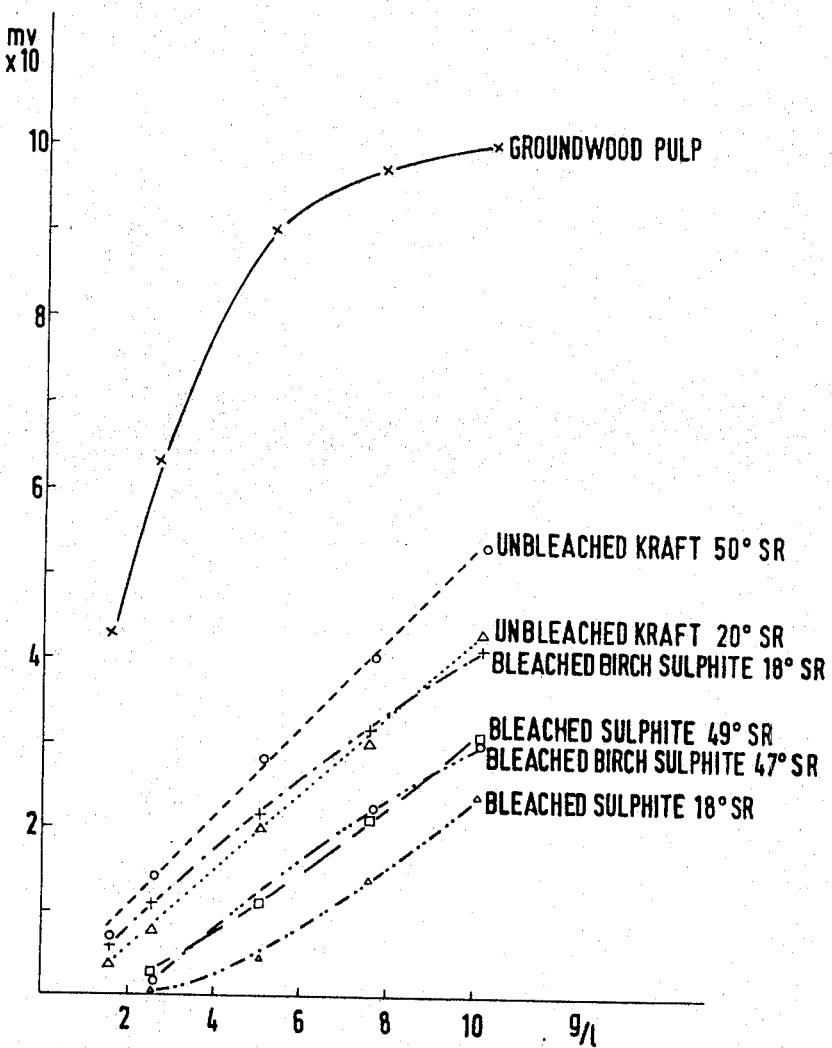

Experiments performed with an instrument based on these principles showed a surprisingly good and nearly linear relationship between fibre concentration and the registered electric signal. This is illustrated in FIG. 3, where the relationship between the recorded electric signal and the fibre concentration is shown for various types of pulp.

By inserting a servo-driven light controlling device in one of the two beams, the two light sensitive devices can be connected in a bridge, the unbalance of which will generate a signal that energizes the above mentioned servo-mechanism until even illumination of the two photo cells is obtained. The position of the light controlling device gives a measure of the fibre concentration.

Figure 4:
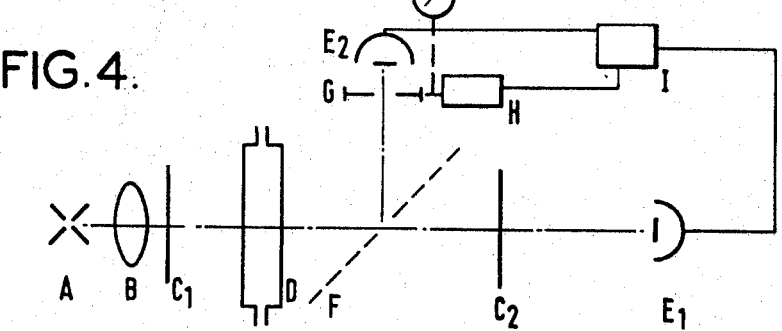

In FIG. 4 is shown an instrument based on this principle. The grey wedge G is controlled by the servomotor H, which gets it signal from the differential amplifier I. The position of the grey wedge is a measure of the fibre concentration.

The instrument may also be constructed with the two mentioned beams falling alternately on the same photocell. An A.C. amplifier may then be used and a better zero stability will be obtained.

An instrument based on this principle is shown in

Figure 5:
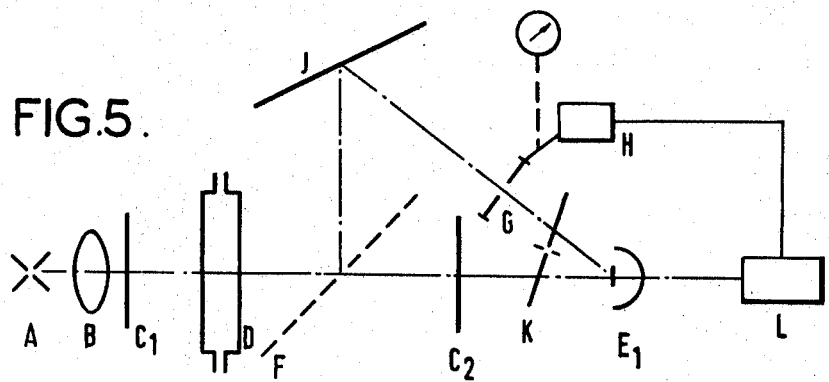

FIG. 5. Light reflected from the semi-transparent mirror F is by means of the mirror J reflected to the photo cell $E_1$, and a rotating chopper K allows light from the two beams to fall alternately on the photo cell. If the concentration of the fibre suspension is changed, light of variable intensity will fall on the photo cell and will generate an A.C. signal in the amplifier L. The servomechanism will change the position of the grey wedge until the photo cell is equally illuminated by the two beams. The position of the grey wedge is a measure of the fibre concentration.

It must be stated that the suggested and above described instruments are only examples given in order to illustrate how the procedure according to the invention may be performed. Any skilled person in this field will without difficulty be able to develop additional solutions of the instrument's design.

I claim:

1. Procedure for continuous measurement in the pulp and paper production of the concentration of fibre suspensions in the region 0%–3%, characterized in that plane polarized light is directed through a fibre suspension and the transmitted light is directed towards a polarizing device whose direction of polarization is rotated, and preferably is at a right angle to the direction of polarization of the incident light, whereafter the transmitted light is directed to fall on a light sensitive device for registration of the light intensity which is a measure of the fibre concentration.

2. Procedure for continuous measurement in the pulp and paper production of the concentration of fibre suspensions in the region 0%–3%, characterized in that plane polarized light in a known way is directed through a fibre suspension and the transmitted light is divided into two beams, of which one is directed toward a polarizing device whose direction of polarization is rotated and preferably is at a right angle to the direction of polarization of the incident light, whereafter the transmitted light falls on a light sensitive device, whereas the other beam is directed towards a second light sensitive device and the two light sensitive devices are connected in such a manner that registration of the fibre concentration is obtained and it is compensated for absorption and dispersion of light in the fibre suspension.

3. Procedure for continuous measurement in the pulp and paper production of the concentration of fibre suspensions in the region 0%–3%, characterized in that plane polarized light in a known way is directed through the fiber suspension and the transmitted light is divided into two beams, of which one is directed towards a polarizing device whose direction of polarization is rotated and preferably is at a right angle to the direction of polarization of the incident light, whereafter the transmitted light falls on a light sensitive device, whereas the other beam is directed towards a second light sensitive device and the light flux in one of the beams is controlled by an adjustable light controlling device which is servo-controlled in such a manner that the two light sensitive devices are equally illuminated from the two beams and the position of the light controlling device is a measure of the concentration of the fibre suspension.

4. Procedure for continuous measurement in the pulp and paper production of the concentration of fibre suspensions in the region 0%–3%, characterized in that plane polarized light in a known way is directed through a fibre suspension and the transmitted light is divided into two beams, of which one is directed towards a polarizing device whose direction of polarization is rotated and preferably is at right angle to the direction of polarization of the incident light, whereas the other beam bypasses the polarizing device and the two beams by means of a mechanical device are alternately brought to fall on the same light sensitive device in such a manner that thereby unbalance is generated an A.C. signal which servo-controls an adjustable light controlling device that controls the light in one of the beams in such a manner that balance is obtained, and the position of the light controlling device is a measure of the concentration of the fibre suspension.

References Cited

UNITED STATES PATENTS

| | | | |
|---|---|---|---|
| 1,971,443 | 8/1934 | Exton | 356—114 |
| 2,509,068 | 5/1950 | McMahon | 356—115 |
| 2,808,755 | 10/1957 | Millen | 356—205 |
| 2,829,555 | 4/1958 | Keston | 356—117 |
| 3,196,739 | 7/1965 | Wenking et al. | 356—117 |
| 3,283,644 | 11/1966 | Saltzman | 356—116 |
| 3,345,907 | 10/1967 | Wada | 356—116 |

RONALD L. WIBERT, Primary Examiner

J. ROTHENBERG, Assistant Examiner

U.S. Cl. X.R.

73—63; 162—49; 356—205, 206